United States Patent
Kim et al.

(10) Patent No.: US 7,762,673 B2
(45) Date of Patent: Jul. 27, 2010

(54) ILLUMINATION SYSTEM TO ELIMINATE LASER SPECKLE AND PROJECTION SYSTEM EMPLOYING THE SAME

(75) Inventors: Sung-ha Kim, Seoul (KR); Sang-whoo Dho, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 12/365,236

(22) Filed: Feb. 4, 2009

(65) Prior Publication Data

US 2009/0141251 A1   Jun. 4, 2009

Related U.S. Application Data

(62) Division of application No. 11/257,018, filed on Oct. 25, 2005, now Pat. No. 7,527,384.

(30) Foreign Application Priority Data

Dec. 15, 2004 (KR) .............................. 2004-106536

(51) Int. Cl.
*G03B 21/14* (2006.01)
(52) U.S. Cl. .................. 353/50; 353/94; 359/213.1; 362/554
(58) Field of Classification Search .................. 353/46, 353/48, 49, 94; 359/196.1, 197.1, 204.1, 359/209.1, 213.1, 214.1; 362/551, 553, 554, 362/561; 385/115, 116, 901
See application file for complete search history.

(56) References Cited

U.S. PATENT DOCUMENTS

| | | | |
|---|---|---|---|
| 4,155,630 A | 5/1979 | Ih | |
| 6,347,173 B1 * | 2/2002 | Suganuma et al. | 385/115 |
| 6,470,122 B1 * | 10/2002 | Doumuki | 385/115 |
| 6,577,429 B1 * | 6/2003 | Kurtz et al. | 359/279 |
| 6,594,090 B2 * | 7/2003 | Kruschwitz et al. | 359/707 |
| 6,600,590 B2 * | 7/2003 | Roddy et al. | 359/287 |
| 6,744,502 B2 * | 6/2004 | Hoff et al. | 356/317 |
| 6,747,781 B2 * | 6/2004 | Trisnadi | 359/279 |
| 7,433,124 B2 * | 10/2008 | Kim et al. | 359/569 |
| 7,527,384 B2 * | 5/2009 | Kim et al. | 353/94 |
| 7,585,078 B2 * | 9/2009 | Kim et al. | 353/82 |

(Continued)

FOREIGN PATENT DOCUMENTS

CN   1330279   1/2002

(Continued)

*Primary Examiner*—William C Dowling
(74) *Attorney, Agent, or Firm*—Stanzione & Kim LLP (57) ABSTRACT

An illumination system designed to remove laser speckle and a projection system including the same. The illumination system includes a laser light source having at least one laser, a diffractive optical element to divide a laser beam emitted from the laser light source into a plurality of sub-beams and to periodically move in such a way as to temporally average the speckle of the laser beam, and an optical fiber bundle including a plurality of fibers with the same length to divide the sub-beams into smaller sub-beams. The illumination system divides the laser beam emitted from the laser light source into sub-beams and temporally or spatially averages the sub-beams, thereby effectively reducing or removing laser speckle. The projection system employing the illumination system can provide improved image quality.

13 Claims, 5 Drawing Sheets

U.S. PATENT DOCUMENTS

2001/0033419 A1 * 10/2001 Odhner et al. ............. 359/573
2003/0174755 A1    9/2003 Lai et al.

FOREIGN PATENT DOCUMENTS

| | | |
|---|---|---|
| CN | 1354842 | 6/2002 |
| JP | 1-128006 | 5/1989 |
| JP | 2-094418 | 4/1990 |
| JP | 4-352108 | 12/1992 |
| JP | 2001-148345 | 5/2001 |
| JP | 2002-277695 | 9/2002 |
| KR | 2004-0000744 | 1/2004 |

* cited by examiner

ILLUMINATION SYSTEM TO ELIMINATE LASER SPECKLE AND PROJECTION SYSTEM EMPLOYING THE SAME

CROSS-REFERENCE TO RELATED APPLICATIONS

This application is a divisional of prior application Ser. No. 11/257,018, filed Oct. 25, 2005, now U.S. Pat. No. 7,527,384 in the U.S. Patent and Trademark Office, now pending, which claims the benefit under 35 U.S.C. §119 of Korean Patent Application No. 10-2004-106536, filed on Dec. 15, 2004, in the Korean Intellectual Property Office, the disclosure of which is incorporated herein in its entirety by reference.

BACKGROUND OF THE INVENTION

1. Field of the Invention

The present general inventive concept relates to an illuminating system designed to eliminate speckle produced by laser light and a projection system employing the same, and more particularly, to an illumination system designed to effectively reduce or eliminate laser speckle by dividing a beam emitted from a laser light source into sub-beams and temporally or spatially averaging the sub-beams and a projection system employing the same.

2. Description of the Related Art

A projection system using a laser light source provides a wide range of color rendition due to a wide color gamut while achieving high optical efficiency due to superior collimation. However, the laser-based projection system suffers from speckle due to a coherence of a laser beam. The speckle results from interference among randomly phased coherent beams reflected from a rough surface. The speckle is a main factor degrading resolution and quality of an image.

Figure 1:
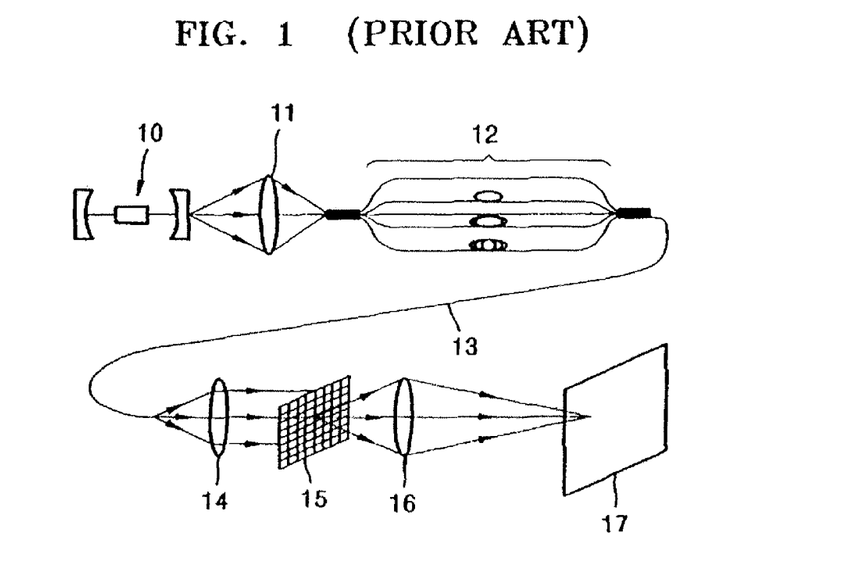
FIG. 1 illustrates a conventional illuminating device.

FIG. 1 illustrates a conventional illuminating device designed to eliminate laser speckle, as disclosed in U.S. Pat. No. 6,249,381. Referring to FIG. 1, in the conventional illuminating device, laser light emitted by a laser light source 10 is incident on a lens 11. Then, the laser light is condensed by the lens 11 and is incident on an incident end of an optical fiber bundle 12. The laser light is emitted through the optical fiber bundle 12 and an optical fiber 13 and illuminates a spatial modulator 15 that is a transmissive liquid crystal display through a lens 14. The conventional illuminating device further includes a projection lens 16 and a screen 17 to form an image thereon.

Since the optical fiber bundle 12 consists of a plurality of optical fibers with different lengths, a beam passing through each fiber has a different optical path length, thus contributing to a reduction in coherency of the beam.

However, since the beams passing through the optical fiber bundle 12 have different phases, the efficiency of speckle removal is degraded. Furthermore, the optical fiber bundle 12 having the optical fibers with different lengths is complicated to manufacture.

SUMMARY OF THE INVENTION

The present general inventive concept provides a slim and compact illumination system that can effectively reduce or eliminate laser speckle by spatially averaging a laser beam using a diffractive optical element or temporally averaging a laser beam using a reflective vibrator, and a projection system employing the same.

Additional aspects of the present general inventive concept will be set forth in part in the description which follows and, in part, will be obvious from the description, or may be learned by practice of the general inventive concept.

The foregoing and/or other aspects of the present general inventive concept may be achieved by providing an illumination system to remove speckle of a laser beam, the illumination system including a laser light source having at least one laser to emit a laser beam, a diffractive optical element to divide the laser beam emitted from the laser light source into a plurality of first sub-beams and to periodically move to temporally average the speckle of the laser beam, and an optical fiber bundle including a plurality of fibers with the same length to divide the first sub-beams into smaller second sub-beams.

Each of the plurality of first sub-beams may include a plurality of beamlets that are focused in an overlaying fashion on one another. The diffractive optical element may be rotatable.

The foregoing and/or other aspects of the present general inventive concept may also be achieved by providing an illumination system to remove speckle of a laser beam, the illumination system including a laser light source having at least one laser to emit a laser beam, an optical fiber bundle including a plurality of fibers with the same length to divide the laser beam emitted from the laser light source into a plurality of sub-beams, and a vibrator to vibrate to temporally average the plurality of sub-beams.

The vibrator may include a reflecting mirror and a piezoelectric element to vibrate the reflecting mirror.

The illumination system may further include a beam-shaping unit located after the optical fiber bundle along a path of the laser beam to convert a cross-section of each of the plurality of sub-beams into a predetermined shape of a display device. The beam-shaping unit may be a light pipe. The beam-shaping unit may include a collimating lens and first and second fly-eye lens arrays or a collimating lens and a beam-shaping diffractive optical element having a diffractive pattern.

The foregoing and/or other aspects of the present general inventive concept may also be achieved by providing an illumination system, including a laser light source unit to emit a laser beam, a movable temporal averaging unit to temporally average the laser beam emitted from the laser light source unit, and an optical fiber bundle having a plurality of optical fibers each having the same length to divide the laser beam emitted from the laser light source unit into a plurality of sub-beams.

The foregoing and/or other aspects of the present general inventive concept may also be achieved by providing an illumination system, including a laser light source to emit a laser beam, a first averaging unit to average the laser beam, an optical bundle to divide the laser beam averaged by the first averaging unit into sub-beams, and a second averaging unit to average the sub-beams.

The foregoing and/or other aspects of the present general inventive concept may also be achieved by providing a projection system to remove speckle of a laser beam, the projection system including a laser light source having at least one laser to emit a laser beam, a diffractive optical element to divide the laser beam emitted from the laser light source into a plurality of first sub-beams and to periodically move to temporally average the speckle of the laser beam, an optical fiber bundle including a plurality of fibers with the same length to divide the sub-beams into smaller second sub-beams, a beam-shaping unit to shape the second sub-beams output from the optical fiber bundle, a display device to produce an image using the second-sub beams shaped by the beam shaping unit, a screen, and a projection lens unit to enlarge and project the image onto the screen.

The foregoing and/or other aspects of the present general inventive concept may also be achieved by providing a projection system to remove speckle of a laser beam, the projection system including a laser light source having at least one laser to emit a laser beam, an optical fiber bundle including a plurality of fibers with the same length to divide the laser beam emitted from the laser light source into a plurality of sub-beams, a beam-shaping unit to shape the plurality of sub-beams passing through the optical fiber bundle, a vibrator to vibrate to temporally average the plurality of sub-beams, a display device to produce an image using the plurality of sub-beams temporally averaged by the vibrator, a screen, and a projection lens unit to enlarge and project the image onto the screen.

The foregoing and/or other aspects of the present general inventive concept may also be achieved by providing an image projection system, including a laser light source to emit a laser beam, a first averaging unit to average the laser beam, an optical bundle to divide the laser beam averaged by the first averaging unit into sub-beams, a second averaging unit to average the sub-beams, and a display device to form and display an image using the sub-beams.

The foregoing and/or other aspects of the present general inventive concept may also be achieved by providing an image projection system, including a laser light source to emit a laser beam, an optical fiber bundle having a plurality of optical fibers to divide the laser beam into first sub-beams, a collimating lens to collimate the first sub-beams, a first fly-lens array to divide the collimated first sub-beams into second sub-beams, a second fly-lens array to focus the second sub-beams to overlap with each other and to provide a beam of a predetermined shape, an averaging unit to temporally average the beam of the predetermined shape, and a display device to form and display an image using the temporally averaged beam of the predetermined shape.

The foregoing and/or other aspects of the present general inventive concept may also be achieved by providing an image projection system, comprising: a laser light source to emit a laser beam, an optical fiber bundle having a plurality of optical fibers to divide the laser beam into sub-beams, a collimating lens to collimate the sub-beams, a beam-shaping diffractive optical element having a predetermined diffractive pattern to shape a cross-section of the sub-beams, an averaging unit to temporally average the sub-beams shaped by the beam-shaping diffractive optical element, and a display device to form and display an image using the temporally averaged sub-beams.

BRIEF DESCRIPTION OF THE DRAWINGS

These and/or other aspects of the present general inventive concept will become apparent and more readily appreciated from the following description of the embodiments, taken in conjunction with the accompanying drawings of which.

DETAILED DESCRIPTION OF THE PREFERRED EMBODIMENTS

Reference will now be made in detail to the embodiments of the present general inventive concept, examples of which are illustrated in the accompanying drawings, wherein like reference numerals refer to the like elements throughout. The embodiments are described below in order to explain the present general inventive concept while referring to the figures.

Figure 2:
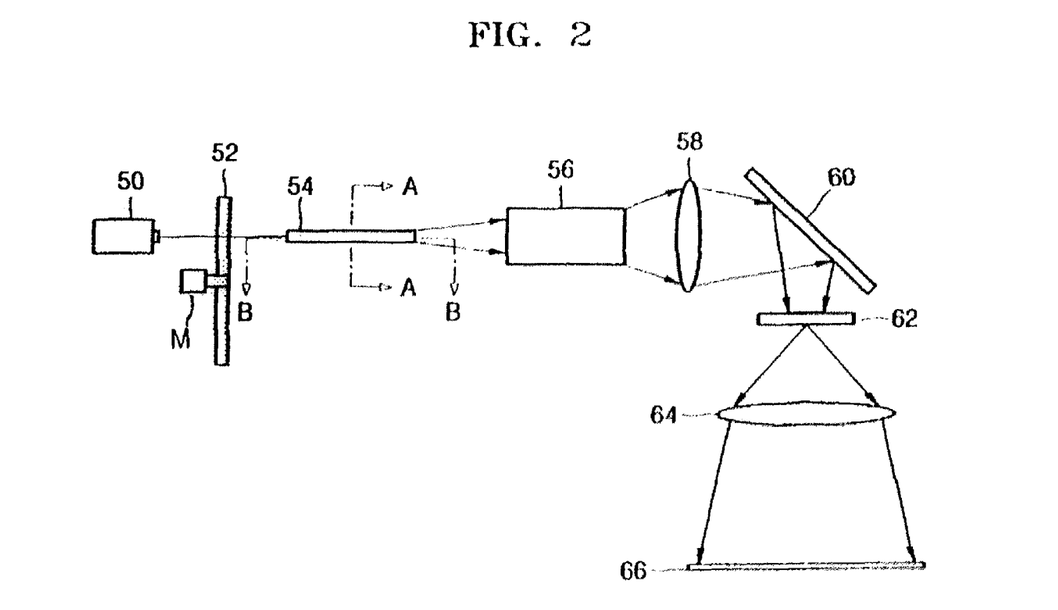
FIG. 2 schematically illustrates a projection system including an illumination system according to an embodiment of the present general inventive concept.

FIG. 2 illustrates a projection system to eliminate laser speckle according to an embodiment of the present general inventive concept. Referring to FIG. 2, the projection system includes a laser light source 50, a diffractive optical element (DOE) 52 to remove the speckle of a laser beam emitted by the laser light source 50, an optical fiber bundle 54 to divide the laser beam passing through the DOE 52 into sub-beams, a beam-shaping unit 56 to shape the sub-beams, and a display device 62 to produce an image from the sub-beams shaped by the shaping unit 56.

The projection system can further include a condensing lens 58 that is disposed in an optical path between the beam-shaping unit 56 and the display device 62 to condense the sub-beams, a projection lens unit 64 to enlarge and project the image produced by the display device 62 onto a screen 66, and a light path changer 60 (e.g., a reflecting mirror) that is disposed in the optical path between the condensing lens 58 and the display device 62 to change a propagation path of the condensed sub-beams such that the condensed sub-beams are directed toward the display device 62.

The laser light source 50 can include a plurality of lasers to emit laser beams with different wavelengths. Each laser may be one of a solid state laser, a semiconductor laser, and a gas laser.

Figure 3:
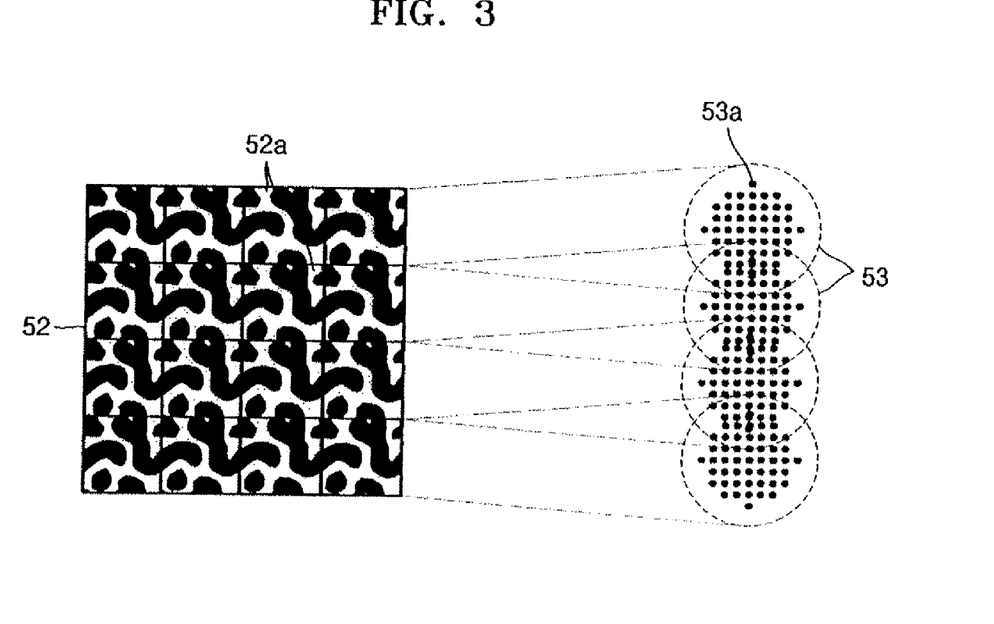
FIG. 3 illustrates profiles of sub-beams produced by a diffractive optical element of the projection system of FIG. 2.

The DOE 52 periodically moves or rotates in such a way as to temporally average laser beams emitted from the laser light source 50, thereby effectively removing laser speckle. FIG. 3 illustrates the DOE 52 of FIG. 2. Referring to FIGS. 2 and 3, the DOE 52 includes a plurality of unit cells 52a. Each of the plurality of unit cells 52a has a predetermined shape, such as circular or various other shapes. The laser beam emitted from the laser light source 50 is divided into a plurality of sub-beams 53 with different phases and optical paths as the laser beam passes through the plurality of unit cells 52a. Each of the plurality of sub-beams 53 includes multiple beamlets 53a focused in an overlaying fashion on one another in such a way as to spatially average the laser beam. Furthermore, the DOE 52 can be rotated by a motor M in such a way as to temporally average the laser beam, thereby eliminating the laser speckle effectively.

Figure 4A:
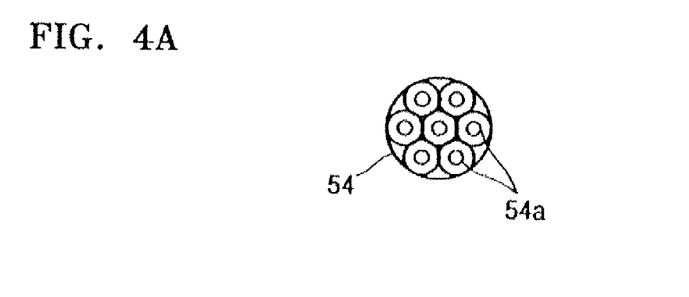
FIG. 4A illustrates a view of a section A-A of an optical fiber bundle of FIG. 2.
Figure 4B:
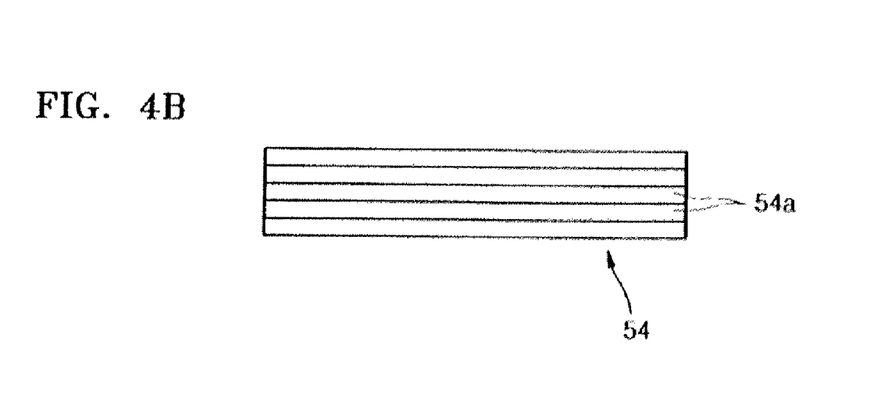
FIG. 4B illustrates a view of a section B-B of the optical fiber bundle of FIG. 2.

FIGS. 4A and 4B illustrate the optical fiber bundle 54 taken along a line A-A of FIG. 2 and taken along a line B-B of FIG. 2, respectively. Referring to FIGS. 2-4B, the optical fiber bundle 54 includes a plurality of optical fibers 54a with the same length to further divide the sub-beams 53 produced by the DOE 52 into smaller sub-beams. Accordingly, the optical fiber bundle 54 and the DOE 52 spatially average the laser beam in order to eliminate coherence of the laser beam.

When a contrast of the laser speckle is less than 4%, the laser speckle cannot be detected by a naked eye. The contrast of the laser speckle is defined by Equation (1):

$$C = \frac{\sqrt{\langle I_i^2 \rangle - \langle I_i \rangle^2}}{\langle I_i \rangle} = \frac{\sigma}{\mu} \times 100(\%) \qquad (1)$$

where $I_i$ is an average intensity of a laser beam passing through an i-th unit cell 52a of the DOE 52, σ denotes a standard deviation of intensity values, and μ is a mean intensity value.

A laser beam with a Gaussian distribution (Gaussian beam) emitted by the laser light source 50 is converted to a beam with a uniform intensity distribution as it passes through the DOE 52. That is, the DOE 52 splits the Gaussian beam into the plurality of sub-beams 53 that are then focused in an overlapping fashion and converted into the beam with the uniform intensity distribution. The optical fiber bundle 54 subsequently further divides the sub-beams 53 into the smaller sub-beams, thus increasing the uniformity of the laser beam.

The beam-shaping unit 56 then shapes a cross-section of the laser beam to match a shape of the display device 62. The display device 62 may be a transmissive liquid crystal display (LCD), a Liquid Crystal on Silicon (LCoS) display, a Deformable Micromirror Device (DMD), a Grating Light Valve (GLV), or the like. The display device 62 may have a rectangular shape with an aspect ratio of 4:3 or 16:9. To achieve high optical efficiency, the beam having a circular cross-section emitted by the laser light source 50 can be shaped to match the rectangular shape of the display device 62. For example, the beam-shaping unit 56 may be a light pipe. A beam incident on the light pipe has a uniform intensity distribution and is shaped to match the cross-section of the light pipe as it is totally reflected within the light pipe. The light pipe can have a rectangular cross-section with an aspect ratio of 4:3 or 16:9, similar to the display device 62.

The condensing lens 58 focuses the beam shaped by the beam-shaping unit 56 onto the display device 62. The light path changer 60, such as the reflecting mirror, is disposed in the optical path between the condensing lens 58 and the display device 62 and changes the propagation path of the laser beam. Since the light path changer 60 may be used usefully to allow effective installation of optical components in the projection system, thus providing a slim and compact projection system, a plurality of light path changers 60 may be arranged if necessary.

The beam shaped by the beam-shaping unit 56 is incident onto the display device 62, and the image produced by the display device 62 is enlarged and projected onto the screen 66 by the projection lens unit 64.

The laser light source 50 can include the plurality of lasers to sequentially emit color beams with different wavelengths. For example, the laser light source 50 may include first, second, and third lasers to respectively emit red (R), green (G), and blue (B) beams. Images corresponding to the R, G, and B beams are sequentially produced and projected onto the screen 66 in order to produce a color image.

Figure 5:
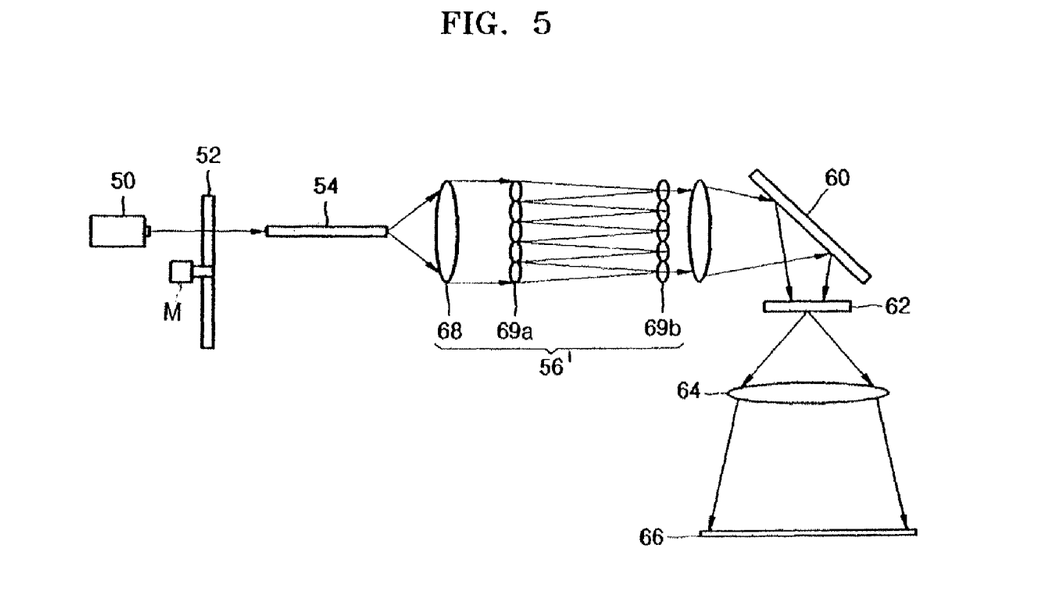
FIGS. 5 and 6 illustrate modified examples of the projection system of FIG. 2 according to various embodiments of the present general inventive concept.

FIG. 5 illustrates a projection system having a modified beam-shaping unit 56' according to an embodiment of the present general inventive concept. The projection system of FIG. 5 has the same construction as the projection system of FIG. 2 except for the beam-shaping unit 56'. Referring to FIG. 5, the beam-shaping unit 56' includes a collimating lens 68 to collimate an incident beam into a parallel beam and first and second fly-eye lens arrays 69a and 69b.

A beam emitted from the optical fiber bundle 54 is collimated into the parallel beam by the collimating lens 68, and is then incident on the first fly-eye lens array 69a. The incident beam is divided into a plurality of sub-beams by unit cells of the first fly-lens array 69a, which are then focused onto corresponding unit cells of the second fly-lens array 69b. The second fly-lens array 69b focuses the sub-beams from the first fly-lens array 69a in an overlaying fashion to provide a uniform shaped beam.

The beam shaped by the beam-shaping unit 56' is focused onto the display device 62 by the condensing lens 58. The image created by the display device 62 is enlarged and projected onto the screen 66 by the projection lens unit 64.

Figure 6:
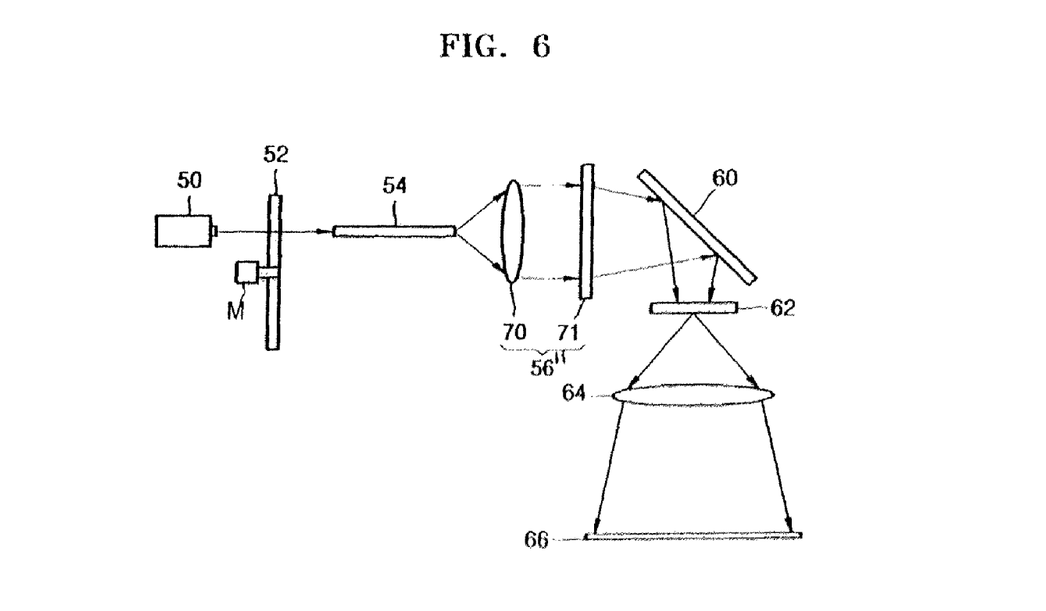

FIG. 6 illustrates projection system similar to the projection system of FIG. 2 having a modified beam-shaping unit 56" according to another embodiment of the present general inventive concept. The projection system of FIG. 6 has a similar construction as the projection system of FIG. 2 except for the beam-shaping unit 56". Furthermore, the projection system of FIG. 6 does not include a condensing lens between the beam-shaping unit 56" and the light path changer 60. Referring to FIG. 6, the beam-shaping unit 56" includes a collimating lens 70 to collimate an incident beam into a parallel beam and a beam-shaping DOE 71 to shape the parallel beam. The beam-shaping DOE 71 shapes the cross-section of a beam emitted from a laser light source 50 to match the shape of the display device 62. Furthermore, a diffractive pattern of the beam-shaping DOE 71 may be used to control a divergence angle of the beam. The diffractive pattern of the beam-shaping DOE 71 can be used to spatially average the parallel beam. By controlling the divergence angle of the beam in such a way as to increase an F-number of an illumination system, a slim and compact projection system can be provided.

The beam shaped by the beam-shaping DOE 71 is incident onto the display device 62, and the image produced by the display device 62 is enlarged and projected onto the screen 66 by the projection lens unit 64.

As illustrated in FIG. 2, an illumination system according to and embodiment of the present general inventive concept includes the laser light source 50 having the plurality of lasers to emit the beams of different wavelengths, the DOE 52 to divide the laser beam emitted by the laser light source 50 into the sub-beams 53, the optical fiber bundle 54 to divide the sub-beams 53 into the smaller sub-beams, and the beam-shaping unit 56 to shape the smaller sub-beams to match the shape of the display device 62 to produce the image.

The beam-shaping unit 56 may be configured in various ways to convert the cross-section of the laser beam emitted from the laser light source 50 into a rectangular shape of the display device 62. For example, while FIG. 2 illustrates the beam-shaping unit 56 as the light pipe, FIG. 5 illustrates the beam-shaping unit 56' including the collimating lens 68 and the first and second fly-eye lens arrays 69a and 69b as, and FIG. 6 illustrates the beam-shaping unit 56" including the collimating lens 70 and the beam-shaping DOE 71.

The illumination system as described above and the projection system employing the same use the rotating DOE 52 to temporally and spatially average a laser beam and the optical fiber bundle 54 to further spatially average the laser beam, thereby effectively removing laser speckle from the laser beam.

Figure 7:
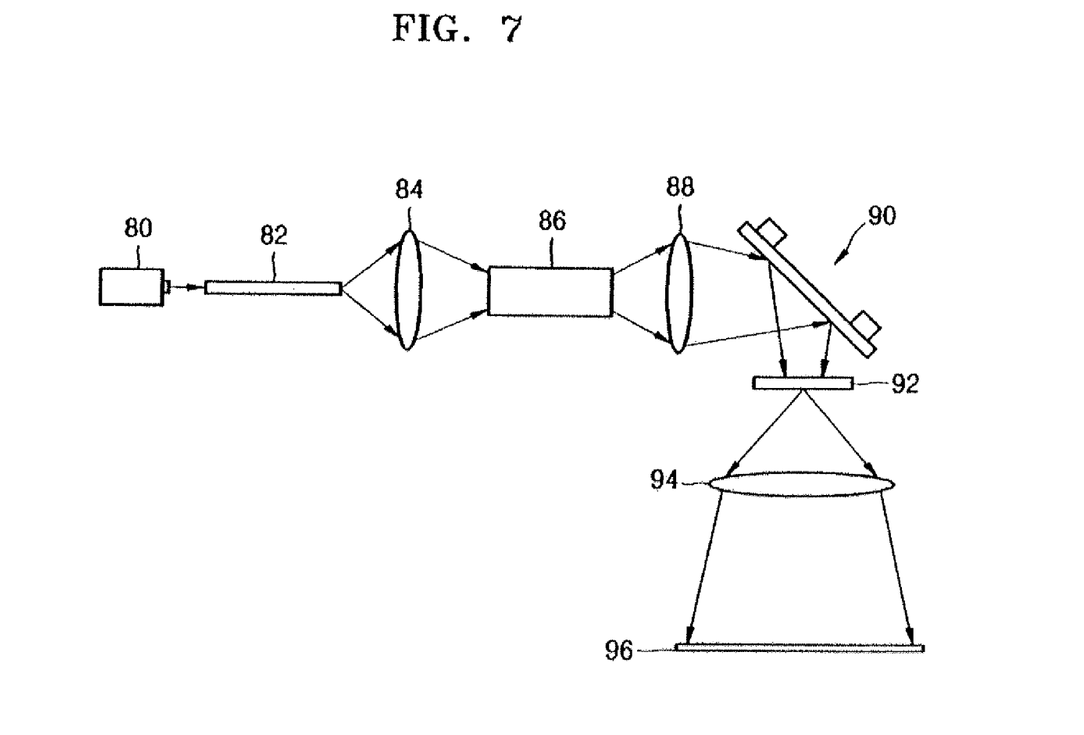
FIG. 7 schematically illustrates a projection system including an illumination system according to another embodiment of the present general inventive concept.
Figure 9:
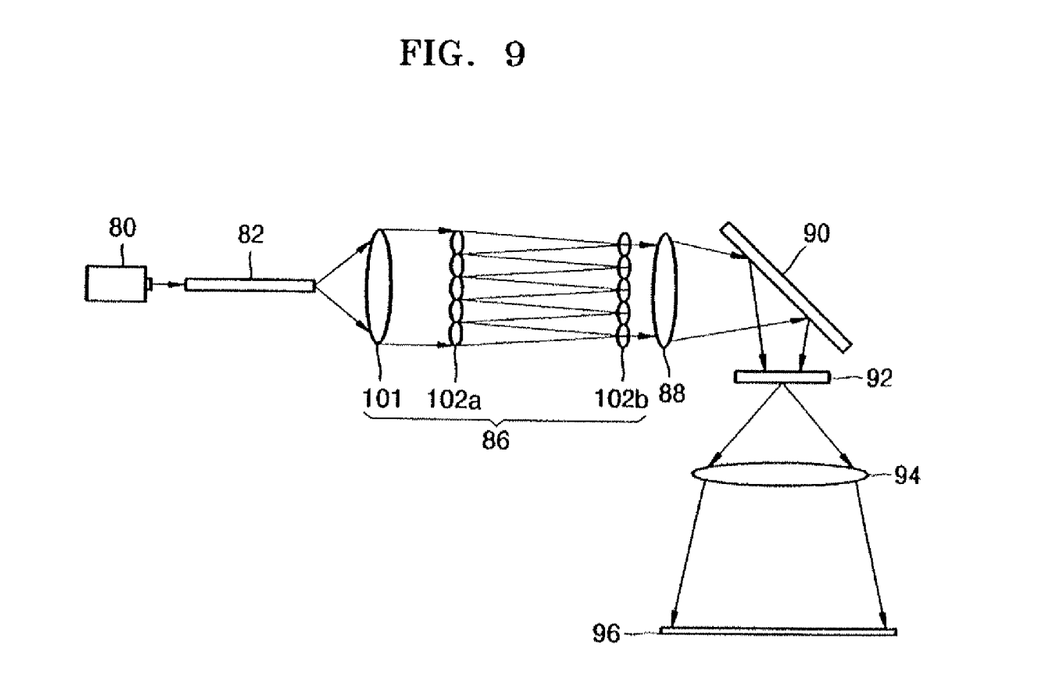
FIGS. 9 and 10 illustrate modified examples of the projection system of FIG. 7, according to various embodiments of the present general inventive concept.
Figure 10:
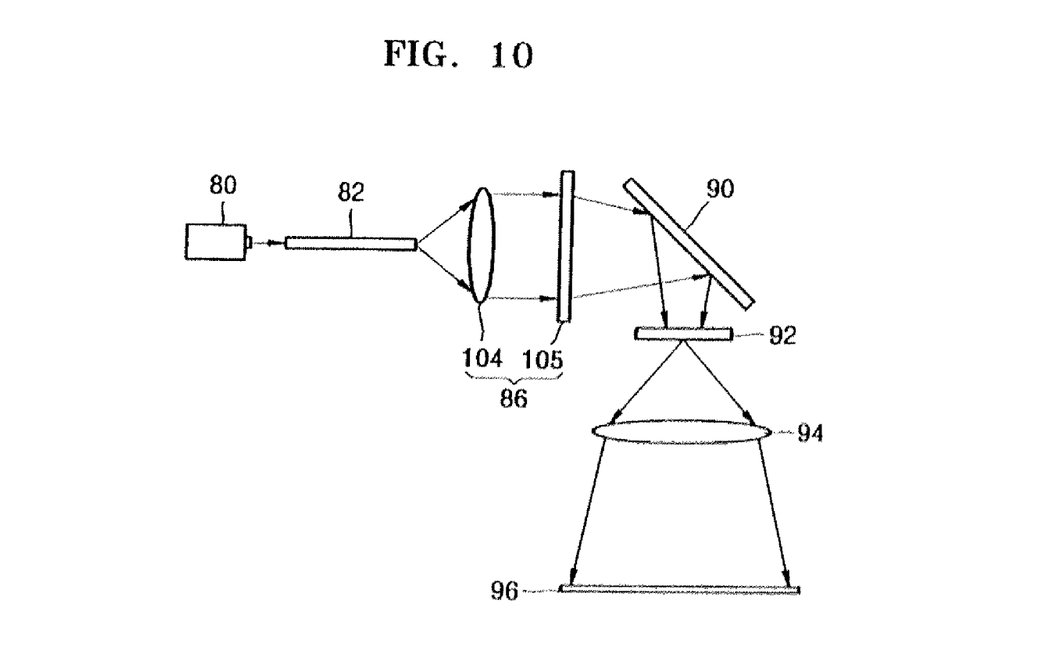

FIG. 7 schematically illustrates a projection system according to another embodiment of the present general inventive concept, and FIGS. 9 and 10 show modified examples of the projection system of FIG. 7 according to various embodiments of the present general inventive concept.

Referring to FIG. 7, the projection system includes a laser light source 80, an optical fiber bundle 82 to divide a beam emitted from the laser light source 50 into sub-beams, a beam-shaping unit 86 to shape the sub-beams, a vibrator 90 to vibrate the sub-beams shaped by the beam-shaping unit 86 in order to remove laser speckle therefrom, and a display device 92 to produce an image using the sub-beams vibrated by the vibrator 90.

The projection system can further include a first condensing lens 84 disposed in an optical path between the optical fiber bundle 82 and the beam-shaping unit 86, a second condensing lens 88 disposed between the beam-shaping unit 86 and the vibrator 90, and a projection lens unit 94 to enlarge and project the image produced by the display device 92 onto a screen 96.

The laser light source 80 sequentially emits laser beams with different wavelengths. The optical fiber bundle 82 includes a plurality of optical fibers with the same length and performs substantially the same operations as described with reference to the optical fiber bundle 54 illustrated of FIGS. 4A and 4B. The laser beam emitted from the laser light source 80 is divided into the sub-beams by the optical fiber bundle 82, and the sub-beams are then focused into the beam-shaping unit 86 by the first condensing lens 84.

The beam-shaping unit 86 converts a cross-section of the beam emitted from the laser light source 80 into a shape of the display device 92. For example, the beam-shaping unit 86 may be a light pipe as illustrated in FIG. 7. Alternatively, the beam-shaping unit 86 may include a collimating lens 101 and first and second fly-eye lens arrays 102a and 102b as illustrated in FIG. 9, or the beam-shaping unit may include a collimating lens 104 and a beam-shaping DOE 105 having a diffractive pattern as illustrated in FIG. 10. As opposed to the projection system of FIG. 7, the projection system illustrated in FIG. 9 may not include the first condensing lens 84 between the optical fiber bundle 82 and the beam-shaping unit 86. The projection system illustrated in FIG. 10 may not include the first condensing lens 84 between the optical fiber bundle 82 and the beam-shaping unit and the second condensing lens 88 between the beam-shaping unit 86 and the vibrator 90.

Figure 8:
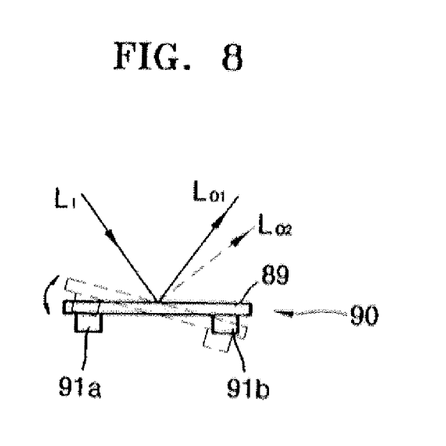
FIG. 8 schematically illustrates a configuration of a reflective vibrator of the illumination system of FIG. 7.

FIG. 8 schematically illustrates the configuration of the vibrator 90. Referring to FIG. 8, the vibrator 90 includes a reflecting mirror 89 to reflect an incident beam $L_i$ and first and second piezoelectric elements 91a and 91b to vibrate the reflecting mirror 89. The incident beam $L_i$ is reflected by the reflecting mirror 89 and emerges as a first beam $L_{01}$ when the reflecting mirror 99 does not vibrate or as a second beam $L_{02}$ when the reflecting mirror 89 vibrates. The beams $L_{01}$ and $L_{02}$ emerging from the reflecting mirror 89 are mixed and averaged spatially, thereby significantly reducing or eliminating laser speckle. The vibrator 90 may be reflective or transmissive.

When the vibrator 90 is reflective, as illustrated in FIG. 7, the vibrator 90 also changes a propagation path of the beam emitted from the laser light source 80, thus contributing to a reduction in the size of the projection system. While it is described above that the vibrator 90 is disposed between the beam-shaping unit 86 and the display device 92, the vibrator 90 may alternatively be disposed between the optical fiber bundle 82 and the beam-shaping unit 86.

The beam reflected by the vibrator 90 is incident on the display device 92 and is spatially modulated according to an input signal to produce the image that is then enlarged and projected onto the screen 96 by the projection lens unit 94.

Referring to FIG. 7, an illumination system according to another embodiment of the present general inventive concept includes the laser light source 80 having a plurality of lasers to emit laser beams of different wavelengths, the optical fiber bundle 82 to divide the laser beam emitted by the laser light source 80 into the sub-beams, the beam-shaping unit 86 to shape the sub-beams to match the shape of the display device 92 to produce the image, and the vibrator 90 to vibrate the sub-beams shaped by the beam-shaping unit 86 in order to temporally average the sub-beams.

The illumination system according to the embodiment of FIG. 7 uses the optical fiber bundle 82 to divide the beam emitted from the laser light source 80 into the sub-beams and the vibrator 90 to temporally average the sub-beams, thereby significantly reducing or eliminating laser speckle.

The beam-shaping unit 86 may be designed in various configurations. Since the beam-shaping unit 86 performs substantially the same operations as the beam-shaping unit 56 of FIG. 2, a description thereof will be omitted.

The embodiments of the present general inventive concept provide an illumination system that can significantly reduce and eliminate speckle produced due to coherence of a laser beam and a projection system employing the same that can provide improved image quality.

The embodiments of the present general inventive concept use a rotating DOE or a vibrator to temporally or spatially average sub-beams, thereby effectively removing laser speckle. The embodiments of the present general inventive concept also use an optical fiber bundle having a plurality of optical fibers with the same length to divide a beam emitted from a laser light source into sub-beams, thus reducing coherence of the laser beam and laser speckle.

Although a few embodiments of the present general inventive concept have been shown and described, it will be appreciated by those skilled in the art that changes may be made in these embodiments without departing from the principles and spirit of the general inventive concept, the scope of which is defined in the appended claims and their equivalents.

What is claimed is:

1. An illumination system to remove speckle of a laser beam, the illumination system comprising:
   a laser light source having at least one laser to emit a laser beam;
   an optical fiber bundle including a plurality of fibers with the same length to divide the laser beam emitted from the laser light source into a plurality of sub-beams; and
   a vibrator to vibrate to temporally average the plurality of sub-beams such that an image is formed according to the sub-beams.

2. The illumination system of claim 1, wherein the vibrator comprises:
   a reflecting mirror; and
   a piezoelectric element to vibrate the reflecting mirror.

3. The illumination system of claim 1, further comprising:
   a beam-shaping unit disposed after the optical fiber bundle along a path of the laser beam to convert a cross-section of each of the plurality of sub-beams into a predetermined shape of a display device.

4. The illumination system of claim 3, wherein the beam-shaping unit comprises a light pipe.

5. The illumination system of claim 3, wherein the beam-shaping unit includes a collimating lens and first and second fly-eye lens arrays.

6. The illumination system of claim 4, wherein the beam-shaping unit includes a collimating lens and a beam-shaping diffractive optical element having a predetermined diffractive pattern.

7. A projection system to remove speckle of a laser beam, the projection system comprising:
- a laser light source having at least one laser to emit a laser beam;
- an optical fiber bundle including a plurality of fibers with the same length to divide the laser beam emitted from the laser light source into a plurality of sub-beams;
- a beam-shaping unit to shape the plurality of sub-beams output by the optical fiber bundle;
- a vibrator to vibrate to temporally average the plurality of sub-beams;
- a display device to produce an image using the plurality of sub-beams temporally averaged by the vibrator;
- a screen; and
- a projection lens unit to enlarge and project the image produced by the display device onto the screen.

8. The projection system of claim 7, wherein the vibrator comprises:
- a reflecting mirror; and
- a piezoelectric element to vibrate the reflecting mirror.

9. The projection system of claim 7, wherein the beam-shaping unit comprises a light pipe.

10. The projection system of claim 9, further comprising:
- a condensing lens disposed between the optical fiber bundle and the beam-shaping unit.

11. The projection system of claim 7, wherein the beam-shaping unit includes a collimating lens and first and second fly-eye lens arrays.

12. The projection system of claim 7, wherein the beam-shaping unit includes a collimating lens and a beam-shaping diffractive optical element having a diffractive pattern.

13. The projection system of claim 7, wherein the display device comprises one of a transmissive liquid crystal display (LCD), a Liquid Crystal on Silicon (LCoS) display, a Deformable Micromirror Device (DMD), and a Grating Light Valve (GLV).

* * * * *